M. E. PETERS, G. H. FATH & A. F. MILLER.
WIPER MECHANISM FOR THE ENDS OF GUM COATED SUCTION TUBES.
APPLICATION FILED APR. 28, 1916.
1,229,511. Patented June 12, 1917.
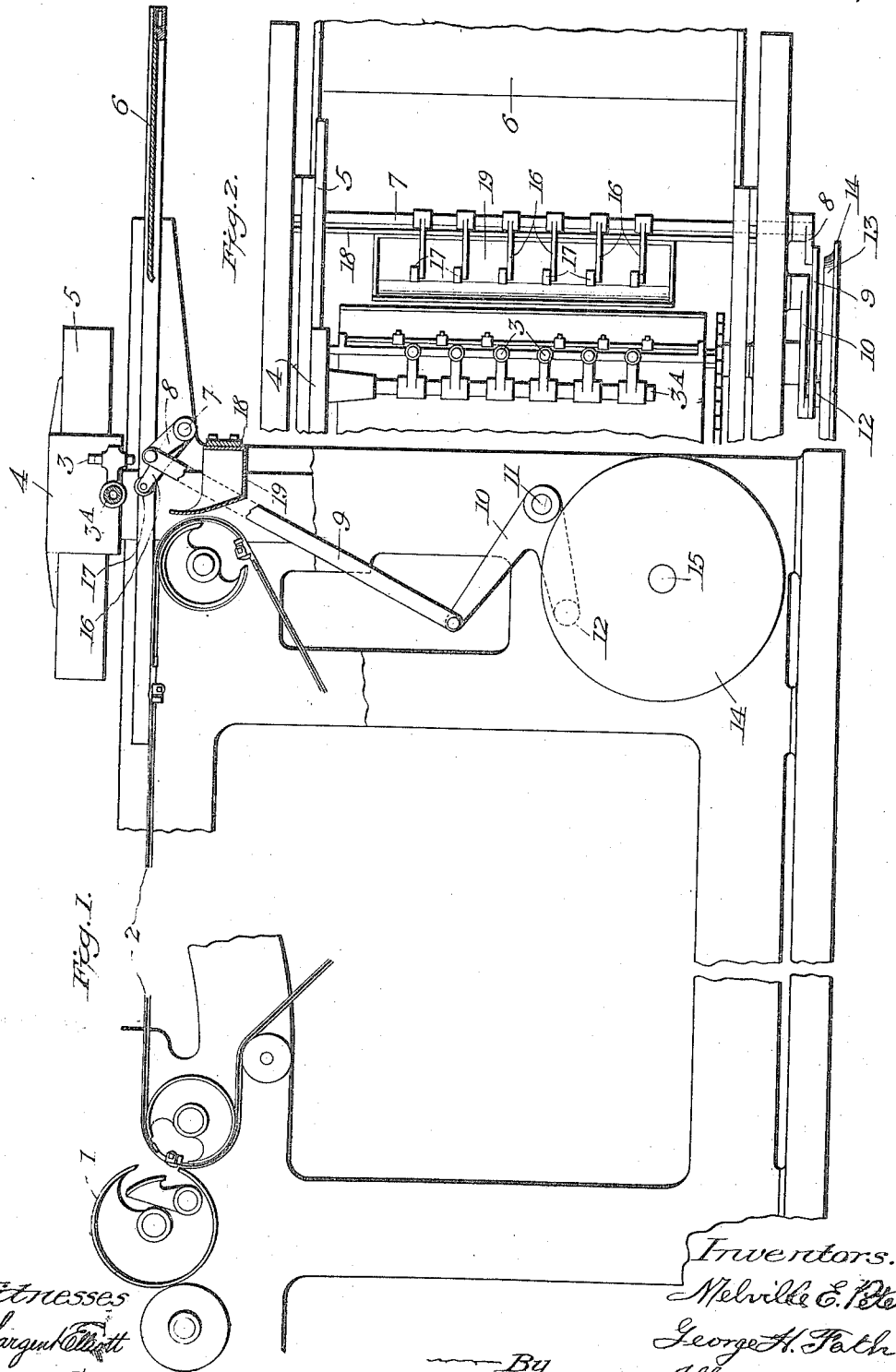

UNITED STATES PATENT OFFICE.

MELVILLE E. PETERS, GEORGE H. FATH, AND ALBERT F. MILLER, OF DENVER, COLORADO.

WIPER MECHANISM FOR THE ENDS OF GUM-COATED SUCTION-TUBES.

1,229,511.  Specification of Letters Patent.  Patented June 12, 1917.

Application filed April 28, 1916. Serial No. 94,204.

*To all whom it may concern:*

Be it known that we, MELVILLE E. PETERS, GEORGE H. FATH and ALBERT F. MILLER, citizens of the United States of America, residing in the city and county of Denver and State of Colorado, have invented a new and useful Wiper Mechanism for the Ends of Gum-Coated Suction-Tubes, of which the following is a specification.
Our invention relates to an automatically operating wiper mechanism for the ends of gum coated air suction operating gummed blank gripping and conveying tubes; and the objects of our invention are:
First, To provide an automatically operating wet wiper mechanism that will wet and clean the ends of the air suction tubes on the return stroke of their reciprocal blank conveying movement. And Second, To provide a simple and reliable wet wiper mechanism that intermittently moves into the path of the air suction tubes and coöperatingly unites with their return stroke movement to wipe off the gum sticking to the ends of the tubes after conveying and discharging a gum blank.

We attain these objects by the mechanism illustrated in the accompanying drawings, in which:
Figure 1, is a side view partly in section of a portion of a blank gumming machine illustrating the application of the improved wipers in connection with the blank holding suction tubes. And Fig. 2, is a plan view of a portion of the machine shown in Fig. 1, the suction tubes being in position to take a blank from the endless conveyer.

Similar letters of reference refer to similar parts throughout the several views.

Referring to the drawings,—

The blanks are gummed either wholly or partially on one side one at a time, and they are fed one at a time from a gumming mechanism onto a conveyer and are conveyed to a predetermined point where the conveyer stops and where suitable air suction tubes move down onto the advance feeding edge of the blank and grip it by an air suction force and lift it off of the conveyer and carry it forward and then move down and place it on the top of a table and release it. We do not illustrate the gumming or conveying mechanism except in outline sketch, in which 1 represents the gumming cylinder and 2 the conveyer, which as represented is an endless conveyer arranged to grip the blanks at the gumming cylinder and convey them on aprons which are provided with blank grippers that grip them at the gumming cylinder and feed them onto the conveyer, which carries them to the point where the air suction tubes 3 grip them.

This air suction gummed blank gripping tube mechanism consists briefly of the following instrumentalities and operates in the following manner:

These air suction blank gripping tubes are mounted on a hollow tubular bar 3ᴀ, which is secured to a reciprocating cross head 4 that is reciprocally and slidably mounted on a horizontally positioned bar 5. This horizontally positioned bar has a short reciprocal movement, which raises the tubes when they first grip the blanks and holds them there while another mechanism carries the tubes forward a short distance, with a blank held to them by an air suction force. Then the reciprocating bar moves down and carries the tubes down against a flat table or plate 6, when the blank is released from the tubes by breaking the suction force in the tubes. The tubes are then returned.

We do not illustrate the different mechanism that causes these tubes to move down on top of the advancing edge of each blank as each apron of the conveyer stops under them, at its stopping station, and then carries them forward and deposits them on the table, or the whole of the apparatus that creates and operates the air suction force in the tubes 3, as these features do not form a part of our present invention. They are however, fully illustrated in our pending application, Serial Number 30471 filed May 25th 1915 for a pneumatically controlled automatically operating blank gumming and tempering machine.

We however, illustrate such fragmentary parts of these mechanisms as are necessary to illustrate the application of our present cleaning mechanism to the gum coated ends of the tubes. To this end we extend a shaft 7 across the machine below the horizontal forward end reciprocal stroke movement of the tubes, and journal its ends in suitable bearings in the side frames thereof.

Upon one end of this shaft we secure one end of a crank arm 8, the opposite end of which is pivotally connected to one end of a connecting rod 9, the opposite end of which is pivotally connected to one end of a rock arm 10, which is pivotally mounted intermediate of its ends on a stub shaft 11 supported in the adjacent side frame of the machine. The opposite end of the rock arm is provided with a roller 12, which engages a cam 13, that is formed on one side of a disk 14, that is secured on a power rotated shaft 15, that extends across and is journaled in the side frames of the machine adjacent to the base plate of the machine.

Upon the cross shaft 7 one of the ends of the same number of crank arms 16 are secured as there are air suction blank gripping tubes, and an arm is positioned on the shaft slightly to one side of the lower end of each tube and extends close to the backward horizontal path of the lower ends of the tubes, and the end of each arm 16 is provided with a roller 17 that is either covered with felt or is made of felt or some other suitable material.

These rollers are arranged to extend directly into the horizontal backward or return stroke movement of the face ends of the tubes, and they are engaged by the tube on their return stroke movement with pressure enough to effect a rubbing contact against and across the rollers. The arms 16 are secured to the shaft 7 in direct alinement with each other, and they have a swinging or oscillating movement of about a third of a full circle. Below these arms we secure to a suitable supporting cross bar 18, which is secured to the side frames, a liquid holding pan 19, which is arranged to receive these arms as they dip down into it. We partially fill this pan with water, but any other suitable solution will answer the purpose.

The operation of these oscillating tube end cleaning wipers is as follows:

The cam and rock arm mechanism imparts an oscillating dipping movement to the row of rollers and their supporting arm, causing them to dip down into the water in the pan and to move up again into the backward stroke path of the tubes, which engage them, causing the water soaked rollers to roll against the face ends of the tubes as they rubbingly press against the rollers in passing them, which effectively cleans the coating of gum from them.

The ends of the tubes are thus engaged by the rollers on each backward movement of their reciprocal blank carrying strokes, and the swinging oscillating movement of the rollers is so timed relative to the reciprocal movements of the tubes as to dip into the water in the pan. Thus they receive a fresh wetting just before the tubes start backward, and then move up into their path in time to engage and be engaged by them.

Our invention provides a simple, effective cleaner for the gummed ends of air suction operating blank gripping tubes, and while we have illustrated the preferred construction we do not wish to be limited to it, as changes might be made without departing from the spirit of our invention.

Having described our invention, what we claim as new and desire to secure by Letters Patent, is:

1. A wiper mechanism for gummed blank transmitting tubes comprising means whereby said tubes grip and transmit a gummed blank intermittently, and means including a wet wiper mechanism arranged to be moved into bearing contact with the blank engaging ends of said tubes after the transmission of each gummed blank.

2. A mechanism for wipingly removing the gum from the gum coated ends of intermittently operating blank gripping and transmitting tubes, comprising a reciprocating tube and a wiper member for each tube, a liquid receptacle in the path of said wipers provided with a supply of a suitable gum removing solution into which said wipers move at each of their reciprocal movements, and means whereby said wipers are moved into rubbing contact with said tubes after each of their blank transmitting movements.

3. In wet wiper mechanism for the gum coated ends of blank transmitting air suction tubes, the combination of a cam and lever actuated reciprocal movement wiper, a reciprocal wiper roller in the return movement path of the gum coated end of each air suction tube, a receptacle provided with a supply of water into which each wiper roller dips at each cycle of its reciprocal movement, and coöperatingly timed means by which said wiper roller engages and is engaged by the return movement of said blank transmitting tubes.

4. In a wet wiper mechanism for gummed coated blank gripping, transmitting and releasing tubes, the combination of a plurality of reciprocating tubes arranged to pick up and forwardly advance a gummed blank on the forward stroke of their reciprocal movement, with vertically reciprocating swinging wiper for each tube, a receptacle in the path of said wipers provided with a supply of water into which said wipers dip and are soakingly wetted, and means including a cam and lever actuated mechanism for moving said wet wiper into rubbing contact with the gum coated ends of said tubes.

5. The combination with the air suction operating intermittently operating gummed blank gripping, transmitting and releasing tubes arranged to transmit gummed blanks one at a time, with the reciprocating wiper arms, the water absorbing and distributing roller at the end of each arm arranged to engage the blank engaging end of a tube, means for wetting said rollers during each reciprocal movement of said rollers and arms, and means for moving said wetted rollers in rolling engagement and contact with said tubes after they release each blank.

6. The combination of the gummed blank gripping transmitting air suction operated tubes, provided with an intermittent reciprocal movement, with the supporting machine frame, the shaft rotatably journaled in said frame, levers secured on said shaft in alinement with the reciprocal stroke of said tubes, a water absorbing and distributing roller rotatably mounted in the end of each lever, a receptacle supported in the downward return path of said roller and provided with a supply of water into which said rollers dip and receive a saturated supply of water, and means including a crank arm on said shaft and a cam and lever actuated mechanism connected to said crank arm for intermittently moving said wetted rollers into the path of and in coöperating engaging relation with said tubes on the return stroke of their reciprocal movement after releasing each tube.

7. The combination of the tubes, with the reciprocal swinging movement shaft, and the levers on said shaft, the water absorbing and distributing rollers at the ends of said shaft, the water holding pan into which said rollers dip and are wetted with water, and means including the cam and rock arm connecting rod mechanism whereby said wetted rollers are reciprocally moved into wiping contact with the gummed blank engaging surfaces of said tubes.

8. The combination of the row of air suction actuated gummed blank gripping, transmitting and releasing tubes, provided with an intermittent reciprocal movement, with the cross shaft, the levers secured to said cross shaft, the water absorbing and distributing fabric rollers on the free end of said levers, one of each of which is arranged and adapted to engage the gum engaging end of one of said tubes, the pan positioned to receive and partially surround said rollers and levers and provided with a supply of water, the crank arm on said shaft, the connecting rod connected to one end of said crank arm, the rock arm connected to the opposite end of said rock arm, and the pawl rotated cam connected to said rock arm whereby said wetted rollers are moved into contact with and wipe off the blank engaging ends of said tubes with said water wetted rollers.

In testimony whereof we affix our signatures in presence of two witnesses.

MELVILLE E. PETERS.
GEORGE H. FATH.
ALBERT F. MILLER.

Witnesses:
G. SARGENT ELLIOTT,
ELIZABETH SMITH.